United States Patent [19]

Rosenberger

[11] 4,096,028
[45] Jun. 20, 1978

[54] FEED FORWARD CONTROL OF DISSOLVED SOLIDS IN A COUNTERCURRENT SEPARATION AND WASHING ZONE

[75] Inventor: Roy R. Rosenberger, Wheaton, Ill.

[73] Assignee: Nalco Chemical Company, Oak Brook, Ill.

[21] Appl. No.: 745,357

[22] Filed: Nov. 26, 1976

[51] Int. Cl.² .......................... D21C 9/02; G06F 15/46
[52] U.S. Cl. .......................................... 162/49; 8/156;
   8/158; 23/230 A; 23/253 A; 68/181 R; 162/60;
   162/252; 162/253; 162/DIG. 10; 364/116;
   364/510
[58] Field of Search ................... 162/49, 60, 252, 253,
   162/DIG. 10, 263; 23/230 A, 253 A;
   235/151.12, 150.1; 68/181 R; 8/156, 158;
   364/116, 510

[56] References Cited

U.S. PATENT DOCUMENTS

| 3,567,574 | 3/1971 | Braitberg et al. | 162/60 |
| 3,814,663 | 6/1974 | Ingemarsson | 162/60 |
| 4,014,736 | 3/1977 | Sexton | 8/156 |

FOREIGN PATENT DOCUMENTS

| 993,541 | 7/1976 | Canada | 162/DIG. 10 |
| 2,252,440 | 6/1975 | France | 162/49 |

OTHER PUBLICATIONS

Gossage et al., "Correlation of Solids and Soda Content with Conductivity in Brown Stock Washer Systems", TAPPI, vol. 60, No. 4, Apr. 1977.

Primary Examiner—S. Leon Bashore
Assistant Examiner—Steve Alvo
Attorney, Agent, or Firm—Hill, Gross, Simpson, Van Santen, Steadman, Chiara & Simpson

[57] ABSTRACT

A technique for controlling the amount of dissolved material in a slurry liquid stream containing dispersed particulate solids which is being continuously processed in a zone of countercurrent particulate solids separation and washing. Flow rates and conductivity measurements are made on streams entering such zone which are then used to estimate the amount of dissolved material in a starting slurry liquid. Preferably, conductivity measurements are made with electrodeless conductivity measuring probes. The technique is well adapted for use in a brown stock washing system employing a plurality of counterflow washers. The technique can be used for measurement of the quantity of gas in an agitated process stream in such a zone.

10 Claims, 6 Drawing Figures

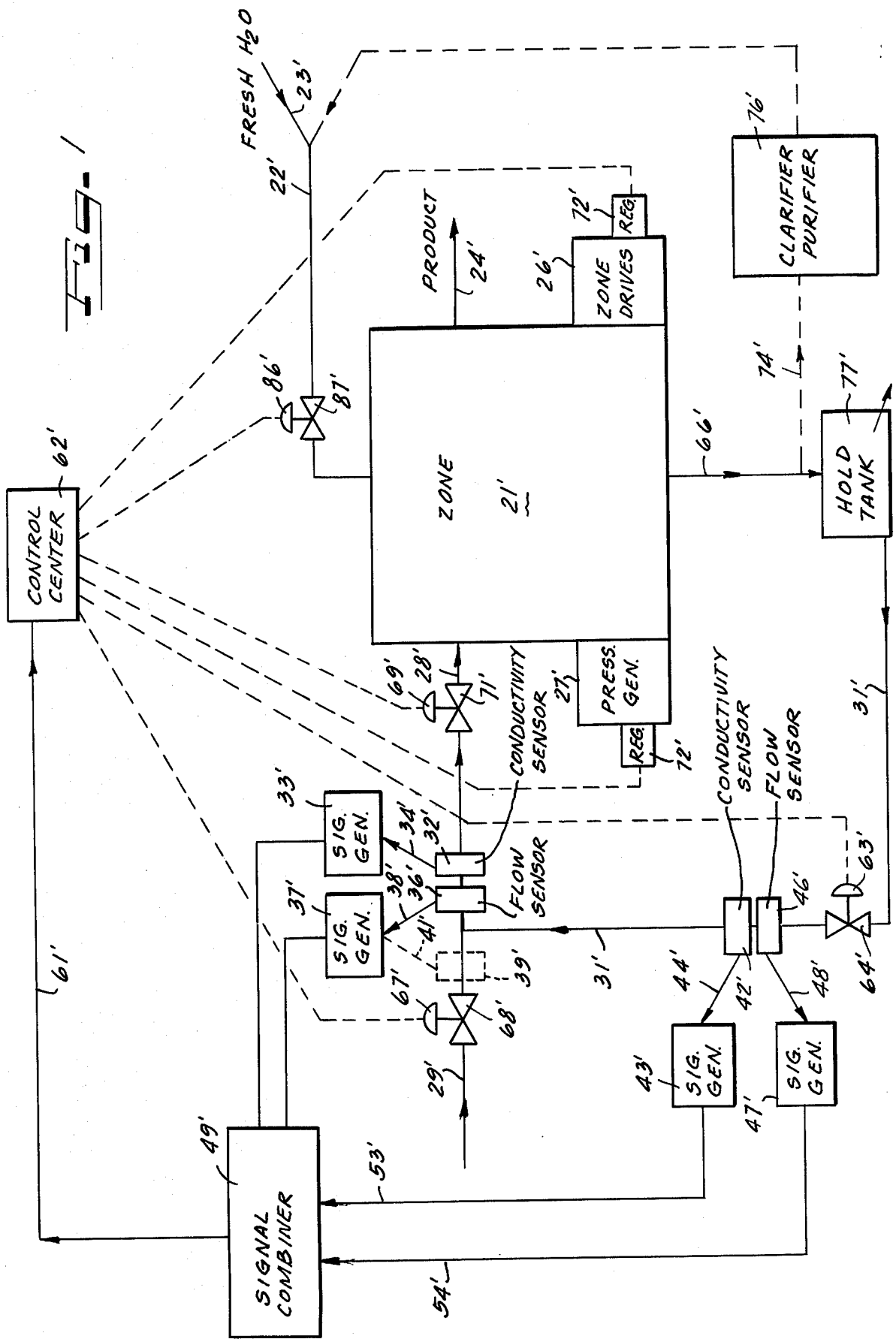

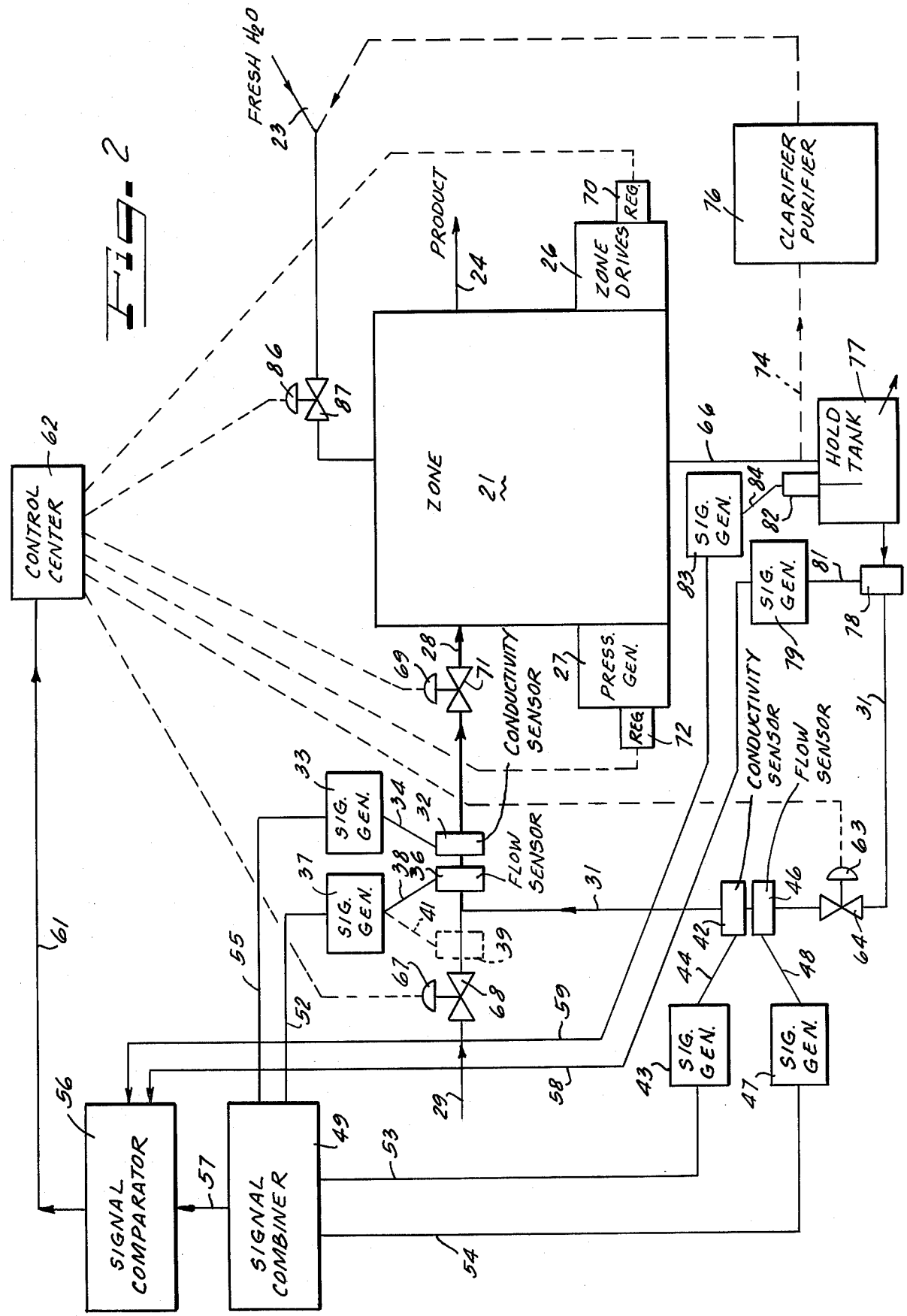

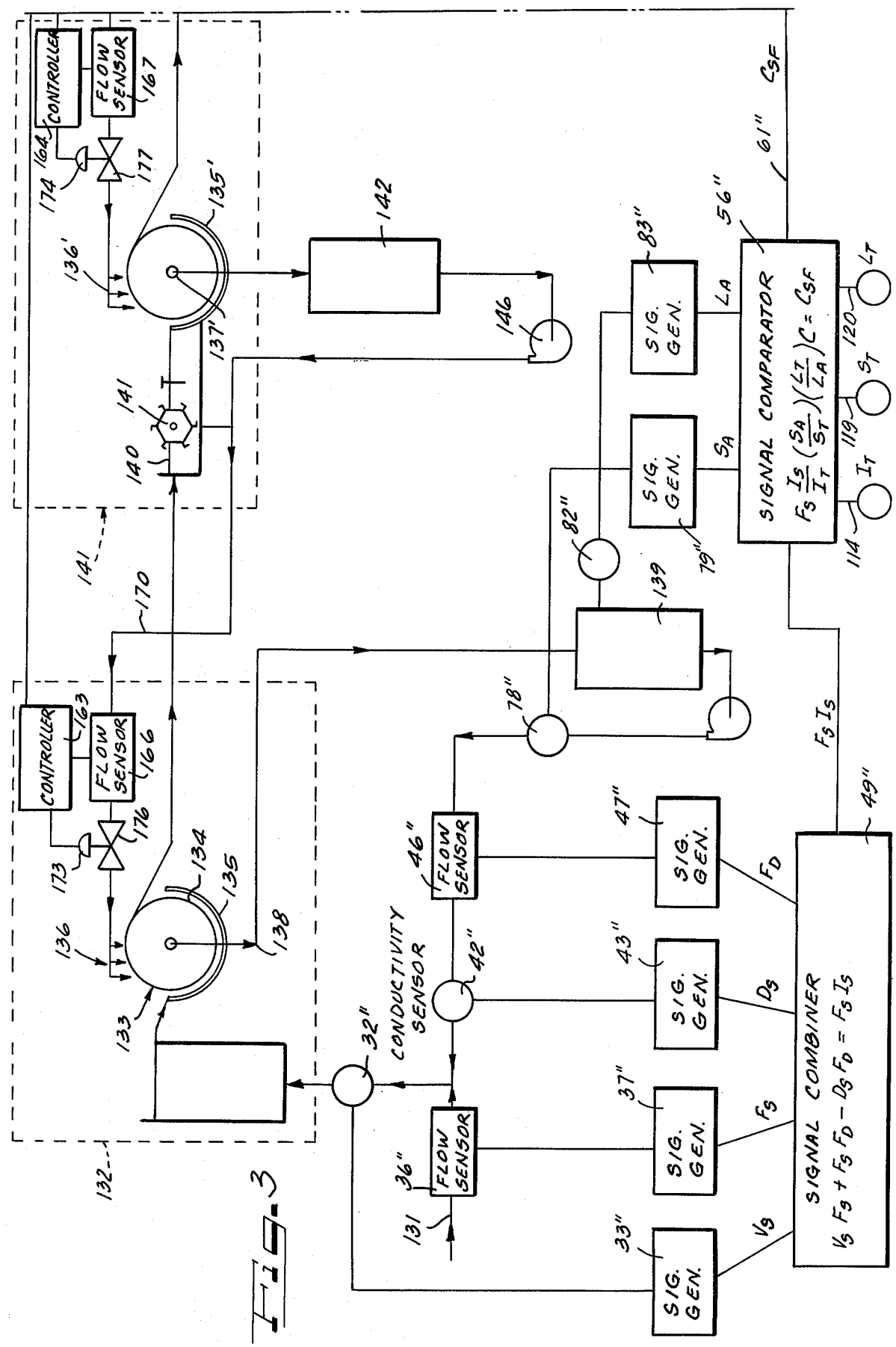

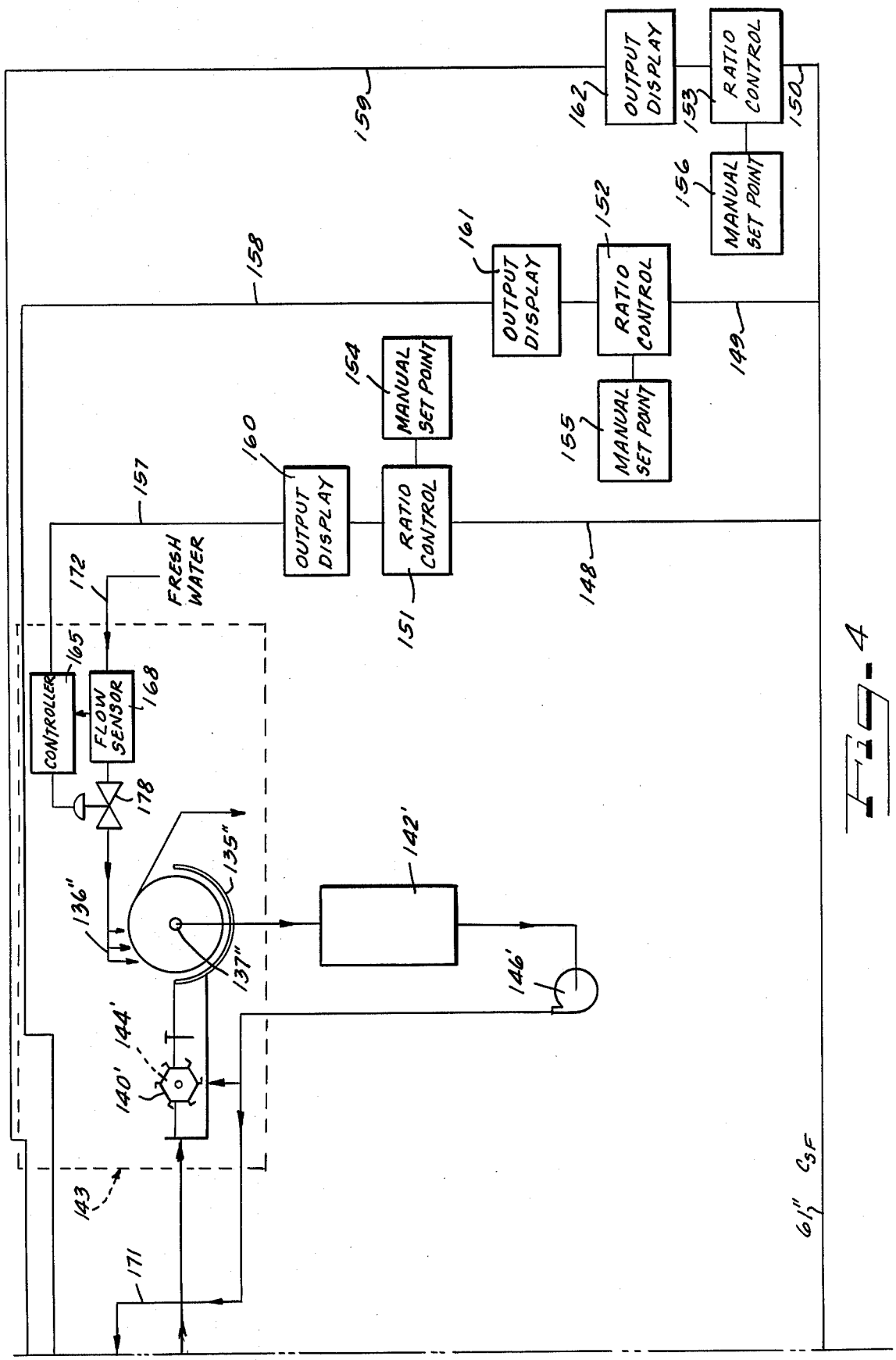

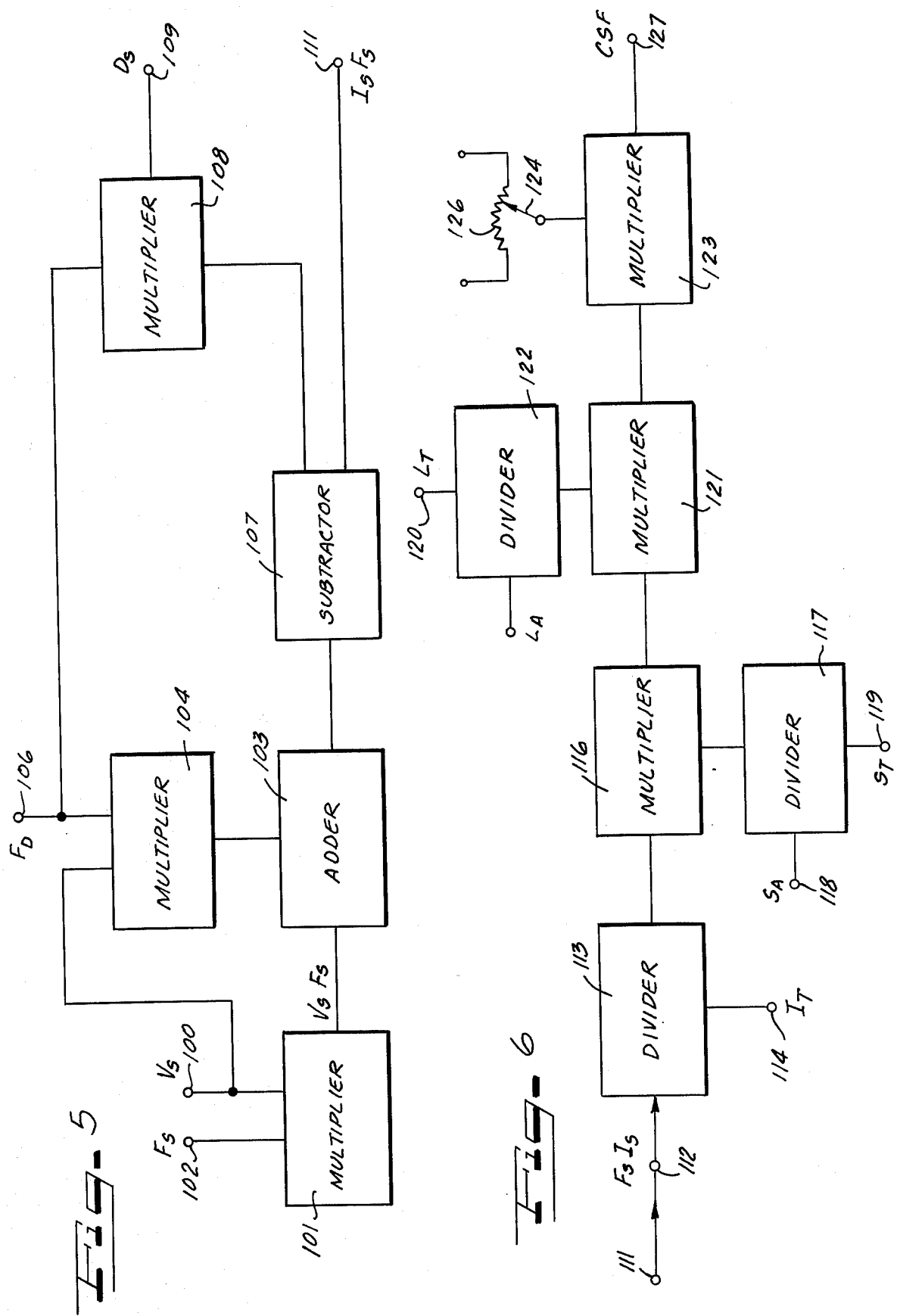

FEED FORWARD CONTROL OF DISSOLVED SOLIDS IN A COUNTERCURRENT SEPARATION AND WASHING ZONE

BACKGROUND OF THE INVENTION

In certain types of chemical processes, an input slurry stream is fed to a process zone wherein countercurrent particulate solids separation and washing are carried out. Such an input slurry stream is characteristically subject to great variability in composition and physical characteristics. For purposes of process control, it would be highly desirable to be able to continuously automatically and accurately monitor the condition of process streams involved in such a process zone which streams are derived from such an input slurry stream.

Means and techniques heretofore known in the art for continuously, simultaneously, and accurately monitoring streams in such a countercurrent process have generally been unstable, inaccurate, cumbersome, and expensive. Typically, in order to obtain accurate results, it was necessary to employ measurement techniques which could not be effectuated on an immediate basis. Commonly, a series of on-line samplings, followed by a series of off-line analytical procedures, resulted in an appreciable time gap between the actual process stream condition and the production of data representative of such condition. Typically, output streams rather than input streams were used as a basis and source for instantaneous process condition measurements.

A basis for an improved control technique for such a countercurrent system appears to lie in the method of measuring process stream parameters. In this connection, it has previously been proposed to measure the conductivity of an electrolyte with an electrodeless probe using two torroidal ferromagnetic cores in a solution. An oscillator is connected to a winding on one of the cores and a winding on the other core is coupled to a detecting circuit; see Relis U.S. Pat. No. 2,542,057. Recently, the Relis principles have been extended so as to provide an electrodeless conductivity measuring system which does not require external compensating apparatus for residual coupling between primary and secondary windings; see Gross U.S. Pat. No. 3,806,798. So far as is now known, no one has heretofore employed a pair of electrodeless conductivity probes for differential, preferably continuous, conductivity measurement in an input process fluid as a part of a process control technique.

BRIEF SUMMARY OF THE INVENTION

There has now been discovered a new and very useful method for controlling in a zone of countercurrent particulate solids separation and washing (a) the amount of dissolved material separated from an input slurry fed into an input slurry end of such zone, and (b) the amount of dissolved material carried out from the product stream output end of said zone in the liquid phase of a product stream from such product stream output end, and apparatus for practicing such method.

such input slurry stream is comprised of a mixture of a starting slurry stream and a terminal recovered recycle liquid stream. Such starting slurry stream is comprised of dispersed particulate solids and washable removables in a liquid phase, and such starting slurry liquid additionally contains dissolved material. Such terminal recovered recycle liquid stream is derived from countercurrent particulate solids separation and washing in such zone, and such terminal recovered recycle liquid containing washable removables and dissolved material therein. Such terminal recovered recycle liquid is held in a holding region before being mixed with said starting slurry stream. Such product stream is comprised of particulate solids and a product slurry liquid, such particulate solids having been subjected to separation and washing in such zone, and such product slurry liquid containing dissolved material therein. Such zone itself comprises at least one stage of continuous particulate solids separation and simultaneous washing of such separated particulate solids by means of a countercurrently flowing stream of recycle liquid. Such zone additionally includes drive means for operating it, and pressure generation means for removal of liquid from such particulate solids being separated in such zone. Such recycle liquid comprises a fresh liquid. Such recycle liquid is fed into said zone at such product stream output end thereof. Optionally, such recycle liquid includes a combined stream of recovered recycle liquid. Recovered recycle liquid is prepared by conventional processes known to those skilled in the art and not forming a part of the present invention.

In practicing the present inventive process, one measures the instantaneous conductivity of such input slurry stream and generates a first signal representative thereof. Also, one measures (1) the instantaneous flow rate of such input slurry stream, and/or (2) the instantaneous flow rate of said starting slurry stream, and generates a second signal representative thereof. Further, one measures the instantaneous conductivity of such terminal recovered liquid recycle stream and generates a third signal representative thereof. Still further, one measures the instantaneous flow rate at which such terminal recovered recycle liquid stream is admixed with such starting slurry stream and generates a fourth signal representative thereof. Such first, second, third and fourth signals are preferably generated simultaneously.

One combines such first, second, third, and fourth signals to produce a fifth signal which is, in effect, representative of the amount of dissolved material in such starting slurry liquid.

Finally one applies said fifth signal to at least one regulator means which is adapted to control certain dynamic process variables in such zone. Such regulator means and such process variables so controlled are selected from among members of the group consisting of (1) first valve regulator means operating a first control valve means across such recovered recycle liquid stream, (2) second valve regulator means operating a second flow control valve means across such starting slurry stream, (3) third valve regulator means operating a third flow control valve means across such input slurry stream, (4) fourth valve regulator means operating a fourth flow control valve means across said input stream of such recycle liquid, (5) speed regulator means operating such drive means for such zone, and (6) pressure regulator means operating such negative pressure generation means for removal of liquid from particulate solids being separated in such zone. Simultaneously, those remaining dynamic process variables which are not associated with said regulator means are each maintained within predetermined variability limits. Thus, the desired control is accomplished.

Preferably such zone incorporates an arrangement comprising at least two successive, interconnected stages of continuous solids separation, each stage with simultaneous washing of the particulate solids separated therein, the washing being achieved by means of a countercurrently flowing such recycle liquid stream. Preferably, in such an arrangement, each adjacent pair of such stages is interconnected by means of a different reslurry stage wherein separated and washed particulate solids from the preceding one of such pair of stages are mechanically slurried in recovered recycle liquid from the following one of such pair of stages, and then the resulting such slurry is fed to such following stage for such particulate solids separation and countercurrent washing, such washing being accomplished by recycle liquid from a down-stream recycle liquid source.

In an optional but preferred mode of practicing this invention, the instantaneous solids content of such terminal recovered liquid recycle stream is measured, and a sixth signal representative thereof is generated. Also, the instantaneous quantity of such terminal recovered recycle liquid in such holding zone is measured, and a seventh signal representative thereof is generated.

Such fifth signal is compared to each of said sixth signal and said seventh signal to generate an eighth signal. Then this eighth signal instead of said fifth signal, is so applied to such regulator means.

A primary object of the present invention is to provide a continuous process for controlling the amount of dissolved material, as indicated above, involved in a zone of countercurrent particulate solids separation and washing which process overcomes the above indicated disadvantages associated with the prior art technology and which further provides an improved, very useful and, commercially practical addition to the art of control technology.

Other and further objects, aims, purposes, features, advantages and the like will be apparent to those skilled in the art from the present disclosure taken with the accompanying drawings.

BRIEF DESCRIPTION OF DRAWINGS

In the drawings:

FIG. 1 is a simplified schematic block diagram illustrating one embodiment of the control process of the present invention;

FIG. 2 is a schematic block diagram of another and preferred embodiment of the control process of the present invention.

FIGS. 3 and 4 are taken together with the left edge of FIG. 3 being adjacent the right hand edge of FIG. 4, and FIGS. 3 and 4 comprise a preferred form of the embodiment of FIG. 2 being used in a three stage zone of countercurrent particulate solids separation and washing;

FIG. 5 illustrates one embodiment of a signal combiner adapted for use in each of the embodiments of FIGS. 1-4; and FIG. 6 illustrates one embodiment of a signal comparator adapted for use in each of the embodiments of FIGS. 1-4.

DETAILED DESCRIPTION

Referring to FIG. 2, there is seen a zone 21 of countercurrent particulate solids separation and washing. As those skilled in the art will appreciate, zone 21 can be in various forms. Zone 21 incorporates at least one stage of continuous particulate solids separation with simultaneous washing of such separated solids by means of a countercurrently flowing stream 22 of recycle liquid. A preferred such stage comprises a rotary drum vacuum washer. The recycle liquid in stream 22 includes a combined stream 23 of countercurrently flowing fresh liquid, such as water, fed into the zone 21 at the region of the product stream 24 output end. Zone 21 includes a drive means 26 for operating the zone 21 and a pressure generation means 27 for removal of liquid from particulate solids being separated in the zone 21.

An input slurry stream 28 is input into zone 21 which stream 28 is comprised of a mixture of a starting slurry stream 29 and a terminal recovered recycle liquid stream 31. The starting slurry stream 29 is comprised of dispersed particulate solids and washable removables in a liquid phase and the starting slurry liquid additionally contains dissolved material therein.

The terminal recovered recycle liquid stream 31 is derived from countercurrent particulate solids separation and washing in zone 21. The terminal recovered recycle liquid contains washable removables and dissolved material therein. After discharge from zOne 21, the terminal recovered recycle liquid stream 31 is passed into a holding region or hold tank 77 before being used for mixing with the starting slurry stream 29. Tank 77 takes up any differential between output from zone 21 and input into stream 29 for stream 31. An additional bleed off on tank 77 is provided to take away the recovered washable and dissolved solids.

The product stream 24 is comprised of particulate solids and a product slurry liquid. The particulate solids are those which have been subjected to separation and washing in the zone 21. The product slurry liquid contains dissolved material therein.

The instantaneous conductivity of the input slurry stream 28 is measured by means of a conductivity sensor 32, and a first signal representative thereof is generated by an associated signal generator 33 interconnected therewith by a line 34. The instantaneous flow rate of the input slurry stream 28 is measured as by a flow sensor 36 and a second signal representative of such flow rate is generated by a signal generator 37 interconnected therewith by a line 38. Alternatively, if desired, the instantaneous flow rate of the starting slurry stream 29 can be measured by a flow sensor 39 and a second signal representative of such flow rate can be generated by signal generator 37 interconnected therewith by means of a line 41. A combination of these respective instantaneous flow rates may be used, if desired, to generate with signal generator 37 the desired second signal.

The instantaneous conductivity of the terminal recovered recycle liquid stream 31 is measured by a conductivity sensor 42 and a third signal representative thereof is generated by a signal generator 43 interconnected therewith by means of a line 44. Conductivity sensors 32 and 42 can be of any convenient type but those described in Gross U.S. Pat. No. 3,806,798 are presently preferred.

The instantaneous flow rate at which the terminal recovered liquid recycle stream 31 is admixed with the starting slurry stream 29 is measured by means of a flow sensor 46 and a fourth signal which is representative thereof is generated by a signal generator 47 which is interconnected therewith by a line 48.

The first signal generated by signal generator 33, the second signal generated by signal generator 37, the third signal generated by signal generator 43 and the fourth signal generated by signal generator 47 are combined by a signal combiner 49 which is interconnected with the individual signal generators 33, 37, 43 and 47 by lines 51, 52, 53 and 54, respectively.

The instantaneous solids content of said terminal recovered liquid recycle stream is measured by any convenient measuring device 78, such as by a conductivity sensor, a nuclear emitter (such as X-ray, (including fluorescense) beta, or gamma radiation) a specific gravity detector, or the like, and a sixth signal which is representative thereof is generated by a signal generator 79 which is interconnected therewith by a line 81.

The instantaneous quantity of terminal recovered recycle liquid in hold tank 77 is measured by any convenient means, such as by a level sensor 82, and a seventh signal representative thereof is generated by a signal generator 83 which is interconnected therewith by a line 84.

By means of a signal comparator 56 which is interconnected with the signal combiner 49 by means of a line 57 a comparison is made to each of the sixth and the seventh signals which are interconnected with signal comparator 56 by means of lines 58 and 59, respectively, and an eighth signal is generated.

As those skilled in the art of chemical process controls will readily appreciate, signal comparator 56 might in other situations be compared to a conventional controller which would use as a set signal (and set point) one which was representative of a predetermined, desired value for the instantaneous conductivity of the input slurry stream 28. Unfortunately, in and for a zone of countercurrent particulate solids separation and washing, it is usual and desired to have the instantaneous conductivity of the input slurry stream 28 vary or "float" owing particularly to process variables upstream involved in the generation of the input slurry stream 28, so that, in the present control process, it was found not practical to use or measure the instantaneous conductivity of the input slurry stream 28. It has been found effective, however, in accord with the present invention, to use instantaneous measurements of the level of terminal recovered recycle liquid in hold tanks 77, and of the gross quantity of solids in such liquid (which can include combined dissolved and suspended solids or only suspended solids, depending upon the technique of instantaneous measurement employed in any given instance, as those skilled in the art will appreciate), and then to compare these measured values to the fifth signal. As used herein, the term "suspended" in reference to solids includes dispersed solids. Also, as used herein the term "instantaneous" in relation to stream property measurements has reference to values determined in an on-line environment on a continuous basis and so a slight time lag (which is negligible from a process control standpoint here) may inherently be involved between, for example, stream condition and particular measured value associated therewith, as those skilled in the art will appreciate.

The eighth signal generated by signal comparator 56 is conveniently output through a line 61 and is applied to at least one regulator means, using, for example, if desired, an optional control center 62, to control particular ones of various dynamic process variables in the zone 21.

In the process of this invention, there are characteristically six different types of process variables and associated regulator means which can be employed. Thus one such regulator means is illustrated by a valve regulator 63 operating a first flow control valve 64 located in the line feeding the recovered recycle liquid stream 66. A second such regulator means is illustrated by valve regulator 67 operating a flow control valve 68 located in the line feeding the starting slurry stream 29. A third such regulator means is illustrated by valve regulator 69 operating a flow control valve 71 located in the line feeding the input slurry stream 28. A fourth such regulator means is illustrated by valve regulator 86 operating a flow control valve 87 located in the line feeding combined fresh and recycled liquid to zone 21. A fifth such regulator means is illustrated by speed regulator 70 operating the drive or drives 26 (as the case may be) for zone 21. The sixth such regulator means is illustrated by pressure regulator 72 which operates the negative pressure generation means 27 which removes liquid from particulate solids being separated and washed in the zone 21.

The exact ratio of fresh liquid to treated terminal recovered recycle liquid in stream 22 (from, in turn, streams 23 and 74) is commonly a matter of equipment function, process operating mode, and the like, and, as such, is not involved in the practice of the present invention, as those skilled in the art will readily understand. Sometimes a recycle stream 22 may be comprised totally of fresh liquid, or sometimes of treated terminal recovered recycle liquid, so that no such ratio is involved. However, as those skilled in the art will appreciate, if a ratio is involved, such can be controlled as desired by conventional means not part of the present invention.

Inside zone 21, terminal recovered recycle liquid is moved from one stage to a next stage through an incoming liquid line 22. By the present invention, in a preferred form, however, the entire system sees only new water (whether or not such is fresh water) entering into it. In the embodiment shown, the system determines how much new water to bring into zone 21 by determining how much new solids have been brought in through line 28 thus yielding control of the solids level in tank 77.

As those skilled in the art will appreciate, various combinations and even individual ones of the dynamic process variables can be regulated to effectuate process control in accord with the present invention. Regardless of the particular combination or choice of dynamic process variables regulated, however, those dynamic process variables which are not associated with signal controlled such regulator means as above described in any given instance are each maintained within predetermined variability limits as the process of this invention is operating.

It is presently preferred to practice the process of the present invention by employing only the regulator 86 and its associated flow control valve 87. In such a mode of operation, the drive 26, the pressure generator 27, and the valves 64, 68 and 71 are all operated at a present (constant) values and so their operation is not effected by the process control of the present invention in such an operational mode. Indeed, valves 64, 68 and 71 with respective regulators 63, 67 and 69 may not even be present in respective streams 31, 29 and 28.

As those skilled in the art will appreciate, particularly when the flow rate of liquid in the recovered recycle liquid stream line 66 exceeds that desired for admixture with the starting slurry stream 29, a portion of such can be bypassed into line 74 and returned to the entering stream of recycle liquid 22. Preferably, the liquid in treated terminal recovered recycle stream 74 is processes through a purifier 76 in accordance with normal commercial practice contemporarily when using a zone of countercurrent particulate solids separation and washing before being recycled into recycle stream 22. Those skilled in the art will appreciate that process economies can be achieved by using a solids recovery system (not shown) in combination with, or as a part of, purifier 76. A solids recovery system can involve evaporating water, collecting condensate, and reusing such in the process; simultaneously recovered or concentrated solids can be reused in the process, if desired, all as those skilled in the art will appreciate.

In a preferred mode of practicing the process of the present invention, the zone 21 comprises at least two stages of continuous solids separation, as will be more fully hereinafter exemplified.

In certain operational modes, the signal comparator 57, the level sensor 82, and the solids measuring device 78, together with associated components, can be eliminated from the practice of the process of the present invention with the result that the embodiment shown in FIG. 2 becomes the embodiment shown in FIG. 1. In FIG. 1, components like those in FIG. 2 are similarly numbered but with the addition of prime marks thereto, for purposes of convenience and simplicity. The embodiment shown in FIG. 1 tends to be less stable in operation than does the embodiment shown in FIG. 2. Nevertheless, the embodiment shown in FIG. 1 represents a useful and practical control technique for achieving the objects of the present invention.

Signal combiner 49 and 49' interrelates the signals received therein from lines 52, 53, 54 and 55 using the following exemplary formulae;

$$V_S + \frac{F_D}{F_S}(V_S) - \frac{F_D}{F_S}(D_S) = I_S \quad (1)$$

Used where ratio of ($F_D/F_S$) is constant $$(F_D/F_S) = (a)$$

Thus $V_S + (V_S - D_S)a = I_S$ $$V_S F_S + (V_S - D_S) F_D = I_S F_S \quad (2)$$

Used where $F_D$ is fixed or known and $F_S$ floats $F_D = a$

Thus $V_S F_S + (V_S - D_S)a = I_S F_S$ $$V_S F_V - D_S F_D = I_S F_S \quad (3)$$

Used where $F_V$ is known and $F_D$ can be constant or known.

$V_S$ (55) = Combined dissolved solids % as measured by conductivity
$F_D$ (54) = Flow of Recycled
$F_S$ (52) = Flow of incoming slurry, position (39)
$F_V$ (52) = Flow of starting slurry, position (36)
$D_S$ (53) = Recycle liquid % dissolved solids as measured by conductivity
$I_S$ (57) = % dissolved solids in incoming slurry stream
$I_S$ (57) = Volume of dissolved solids flow per unit time into process Those skilled in the art will appreciate that any two of the flow sensors 39, 36, and 46 can be employed as input signals to the signal combiner such as 49, to calculate either the $I_S F_S$ value or the $I_S$ value of any given system, in accord with the teachings of this invention. Signal comparator 56 interrelates the signals received therein from lines 57, 58 and 59 using at least one of the following formulas:

SpGr = Specific Gravity
SpGrT = Specific Gravity target or process limit
Level = Tank level
Level T = Tank level target, or process limit
$I_S$ = from equation (1) above, % dissolved solids
$I_T$ = Incoming solids % target or process limit
[$I_S F_S$] = from equations (2) or (3) above, volume dissolved solids per unit time.

Each of $a$, $b$, $c$, $d$, $e$, and $f$ is a constant determined by machine efficienty in a particular operating system.

$$([I_S F_S])/(C + (F_S)^d(a)) = \text{calculated shower flow} \quad (4)$$

$$F_S(a) + I_S(b) = \text{calculated shower flow} \quad (5)$$

$$[(4)] (Sp\,Gr/SpGrT) = \text{calculated shower flow} \quad (6)$$

$$[(5)] (SpGr/SpGrT) = \text{calculated shower flow} \quad (7)$$

$$[(6)] (Level/Level_T) = \text{calculated shower flow} \quad (8)$$

$$[(7)] (Level/Level_T) = \text{calculated shower flow} \quad (9)$$

$$[(5) \text{ or } (7) \text{ or } (9)] - F_S^d(a) + C = \text{calculated shower flow} \quad (10)$$

$$F_S \frac{I_S}{I_T}(b) \frac{SpGr}{SpGrT}(e) \frac{Level}{Level\,T}(f) - F_S^d(a) + C = \text{calculated shower flow} \quad (11)$$

One embodiment of a suitable signal combiner 49 or 49' is shown in FIG. 5 where an output signal $I_S F_S$ appears at its output and is used as such (FIG. 1) or fed to the signal comparator 56. Thus, a first terminal 100 which receives the signal $V_S$ and supplies it to a multiplier 101 which also receives from input terminal 102 the signal $F_S$. The output of the multiplier is the product of the two inputs which is supplied to an adder 103 which (also receives an input from a multiplier 104 that receives at one of its input terminals a signal $V_S$ from terminal 100 and a second input at input terminal 106 which is the signal $F_D$ and multiplies the signals together. The output of the adder 103 is supplied to a subtractor 107 which also receives an input from a multiplier 108. The multiplier 108 receives an input signal proportional to $F_D$ from terminal 106 and also receives an input from input terminal 109 which is equal to $D_S$ and multiplies the two input signals together. The output of the subtractor 107 appears at terminal 111 and is the ouput of the signal combiner 49 or 49'.

One embodiment of a suitable signal comparator 56 is illustrated in FIG. 6. The output terminal 111 of the signal combiner 49 is connected to the input terminal 112 of the signal comparator 56. The signal comparator 56 includes a divider 113 which is connected to the input terminal and receives the signal $F_S I_S$. It is also connected to an input terminal 114 which receives an input signal $I_T$ which is the signal proportional to the percentage of solids target and is set manually if desired. The output of the divider 113 is supplied to multiplier 116 which also receives an input from a divider 117 that receives a signal $S_A$ proportional to the filtrate solids and divides it by an input applied to terminal 119 which is the signal $S_T$ proportional to the percentage solids target. The output of the divider is applied to the multiplier 116 wherein the two inputs are multiplied together and supplied to a multiplier 121.

The multiplier 121 receives an input from divider 122 which receives input signals $L_T$ proportional to the set desired level and $L_A$ which is the actual level in the tank and divides $L_T$ by $L_A$ and supplies the quotient to multiplier 121. Multiplier 121 multiplies this input with the input from multiplier 116. A multiplier 123 receives the output of the multiplier 121 and also receives an input "a" from a wiper contact 124 which receives a set signal from a potentiometer 125. The multiplier 123 multiplies the input from the multiplier 121 with a constant "a" and produces an output signal supplied to terminal 127 $D_{SF}$ which comprises the calculated shower flow.

In an actual embodiment constructed according to the invention, multipliers, dividers, adders and subtractors utilized were available from the Devar Company, Control Products Division. It is to be realized that type multiplier dividers, such as Devar module type 19-302 are capable of multiplying a number of signals together in a single stage and, thus, the block diagrams of FIGS. 5 and 6 are used for illustrative purposes to explain the invention. Devar type 19-301 adder/subtractor modules can be used as the adders and subtractors illustrated in FIGS. 5 and 6.

Also, it is to be realized that the constant "a" illustrated in FIG. 6, can be composite constant resulting from combining a number of constants required in the control equations such as by multiplying a plurality of constants together or by adding a plurality of constants as required for the desired control operation to obtain the composite constant "a".

Also a factor for compensating for the machine efficiency can be used in calculating CSF in the comparator 56 by subtracting from the signal at terminal 127 a factor equal to $(F_S)^x C_2 + C_3$ where $x$ is a process determined exponent, and $C_2$ and $C_3$ are constants.

The inventor has discovered that under certain conditions it is possible to assume that the ratio $F_D:F_S$ is equal to one and then the equation to be solved by the signal combiner can be reduced to $V_S - (a) D_S = I_S$.

Preferably, the control technique of the present invention is used to control only the ratio of countercurrently charging recycle liquid and recovered recycle liquid to each of the separating/washing stages in a multistage zone 21 with all other process variables, as enumerated above, being held constant. The output signal from the signal comparator 56 (in the case of the FIG. 2 embodiment), or the signal combiner 49 (in the case of the FIG. 1 embodiment), is fed to suitable controller (regulator assemblies associated with individual variable valve means operating in each individual stages of a zone 21. To account for individual variations in operating characteristics of each stage, ratio controls can be employed, if desired, in combination with a normal set point for the output signal used to control each variable valve means.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE A

Brown Stock Washing System

Cooked pulp from sulfite digesters (not shown) is filtered through a hot stock screen (not shown) and charged to a feeder line 131 leading to the first stage 132 of a three stage brown stock washing system as shown in FIGS. 3 and 4. In such stock washer, the pulp is washed with water to remove the black liquor that would otherwise contaminate the end product made from the pulp, and to recover the maximum amount of spent cooking chemicals with minimum dilution.

In the stock washer, each stage incorporates a vaccum washer 133, the stages being connnected in series with one another and having a countercurrent flow of wash water.

Each vacuum washer utilizes a wire cloth-covered drum or cylinder 134 that rotates in a vat 135 containing a charged pulp slurry. The lower section of each drum 134 is submerged in the pulp. By means of internal valving, vacuum is applied as the rotating drum enters the pulp slurry. The black liquor drains through the wire cloth (not detailed) leaving a layer of pulp on the face of the wire, and is held there by the vacuum inside the cylinder. The layer of pulp continues to build up as the submerged portion of the drum 134 rotates through the pulp slurry in the vat. As the cylinder 134 continues to rotate, the thick layer of pulp, adhering to the face wire, emerges from the slurry. Black liquor continues to drain from the pulp as a result of the differential pressure between the external atmosphere and the vacuum within the cylinder. Showers 136 are located over the pulp sheet to displace the black liquor with water as the drum continues to rotate. Finally, as the drum revolves, the vacuum is cut off, and the washed pulp is removed from the face wire of the drum 134.

The filtrate leaves washer stage 132 through the hollow pipe axis 137 of the cylinder, which also serves as the trunnion on which the cylinder rotates. This outlet is connected to a dropleg 138 that discharges to the filtrate hold tank 139. The latter is of such size as to allow at least some of the entrained air to escape from a filtrate before pumping such filtrate back to a feed stream 131 or a repulping station, such as statin 140 of a preceding stage 141. Stage 141 employs a filtrate hold tank 142 analogous to filtrate hold tank 149 except that here effluent from the tank 142 is fed back to the repulping station 140 as well as to the shower 136 of stage 132.

The number of washer stages required is generally dependent on the strength of the liquor with the pulp as blown. Here three stages are employed. In FIGS. 3 and 4, components of the individual down stream stages (with respect to the direction of stock flow) are similarly numbered to one another, but with the addition of prime marks and double prime marks, respectively, thereto for purposes of convenience and simplicity in description. The physical size of each washer is generally designed to handle a pulp amount equivalent to an infeed of 1.0 to 1.25% air-dry consistency to each vat, such as vat 135. Thus, the drainage rate of freeness of stock determines the size of the cylinders in any given operation. The foaming characteristics of the liquor also influence the number of stages. For instance, relatively non-foaming liquor, such as from hardwood, can be removed in three stages. For the same rate and efficiency, it would require four stages for Southern pine with its high soap content and foaming characteristics.

In the stock washer, between 98 and 99% of the spent chemicals are thus washed out of the pulp. The minimum loss of soda is about 15 lb per ton of pulp, and this soda is so strongly held in the pulp that no reasonable amount of continuous washing will remove it. The "soda loss" referred to here is actually a colloquialism. The term refers to the amount of sodium, expressed as an inorganic chemical (generally that purchased), actually present in the stock. The sodium leaves the washing system (with the pulp) in the form of sodium lignates and is organic in nature. There is relatively little actual $Na_2SO_4$ present in the spent black liquor losses.

There is characteristically a definite variation in the amount of chemical washed out of the pulp sheet on a vacuum cylinder, because the surface of the sheet (where the wash water is applied) is cleaner than the pulp adjacent to the wire cloth at the bottom of the pulp sheet; thus the wash water becomes richer in black liquor as it passes through the sheet. To overcome this, the pulp sheet discharged from the first vacuum washer is repulped or reslurried before travelling over the second vacuum filter. This is repeated between each vacuum filter in the washing sequence.

The pulp sheet from each drum surface is removed by a doctor blade and the pulp is charged for repulping to a so-called repulper, there being one repulper such as 140 between each successive pair of stages such as stages 132 and 141. Each repulper conventionally employs a wheel, such as 144 in repulper 140 with teeth and arms. As such wheel 144 rotates, it breaks up the pulp from a sheet or mat obtained from a preceding stage.

In each stage, the pulp and fresh water flow countercurrently to each other in multistage washing, in order to minimize dilution of the black liquor. Thus, for example, the hot water is used to wash the pulp on the last stage washer, and the filtrate or water that was pulled through the pulp sheet by the vacuum on this washer is used to wash the pulp on the preceding washer, and so on.

The wash water is heated for maximum solubility of the solids to be removed from the pulp. The upper limit in temperature of the wash water is determined by the vacuum carried on the first washer. Practical limits are 180° to 185° F, since higher temperatures tend to result in too high an evolution of steam from the black liquor, thus reducing the vacuum, and, hence, the drainage of black liquor through the pulp sheet on the first washer.

The actual efficiency of each stage of washing is a function of the vat consistency (maximum wrenching), pulp discharge consistency (maximum wringing out), and the amount and the displacement ratio of the wash water. This latter is a function of the even distribution of wash water over the cake or sheet, and of a constant optimum ratio of water used to pulp produced.

The wash water applied to the pulp sheet on the washer is kept at a low velocity by using multiple showers. This is done for two reasons: (1) to provide good distribution of the wash water over the pulp sheet, without disturbing the sheet formation; and (2) to minimize the generation of foam on the first two stages of washing where the black liquor concentration of the wash water is higher. The foam has an adverse effect on washing efficiency, for the small bubbles not only impede the passage of wash showers through the pulp sheet, but also result in a greater carry-over of solids to the subsequent washer. Chemical agents are used to reduce the foam.

In the washing system, the liquor tanks are kept approximately one-third full, to allow ample room for the foam to separate from the liquor and time for the liquor to run out of the foam. The size of the liquor tanks depends upon the viscosity of the liquor at each stage and its foaming characteristics. Large pipe connections are made, between the filtrate tanks at the foam-liquor interface, to a central foam tower equipped with foam breakers; the black liquor and heavy soap are separated in the lower section of this tower.

Pumps 146 and 146' move recovered recycle liquid from hold tanks 142 and 142' respectively to repulper 140 and shower 136, and to repulper 140' and shower 136'.

The most concentrated black liquor filtrate is transferred to the evaporators.

The weak black liquor will contain varying amounts of fiber, depending on the condition of the face wires on the vacuum filters or the strainers in the continuous digester. This pulp will have a cumulative adverse effect on the black liquor evaporators, where it tends to accumulate and reduce the heating capacity. For this reason, a black liquor filter is frequently used to minimize the amount of fiber going to the evaporators or black liquor oxidation tower.

The washed pulp discharged from the last washer stage 143 is usually put in a surge tank (not shown) to take care of minor changes in production rates between the washers and the subsequent operations. Storing the washed pulp at this point is common practice, since the vaccum cylinder discharges the pulp at a relatively high consistency. Thus, a proportionately greater amount of pulp can be stored in a tank of a given size.

The signal from the signal comparator 56 passes through the line 61" to each of lines 148, 149 and 150. Each of the lines 148, 149 and 150, respectively, feeds a ratio control 151, 152 and 153. Each ratio control is regulated by a manual set point 154, 155, and 156, respectively. The output signal from each ratio control 151, 152 and 153 emerges through a line 157, 158 and 159. In each of the lines 157, 158 and 159 is an optional output display 160, 161 and 162, respectively. The signal in each of the respective lines 157, 158 and 159 is fed to a controller 163, 164 and 165, and the input to such controller 163, 164 and 165, respectively, becomes the set point therefor. Flow sensors 166, 167 and 168, respectively, in each of the water feed lines 170, 171 and 172, respectively feeding the individual stages 132, 141 and 143, respectively, are interconnected with the respective controllers 163, 164 and 165. The output from the respective controllers 163, 164 and 165 is fed to the regulators 173, 174 and 175, respectively. In turn, each of the regulators 173, 174 and 175 is interconnected with a variable valve 176, 177 and 178, respectively. As those skilled in the art will appreciate, the lines 170, 171 and 172 are analogous to the line 22 in FIG. 2.

I claim:

1. A continuous process for controlling in a zone of countercurrent particulate solids separation and washing (a) the amount of dissolved material separated from an input slurry fed into the input slurry end of said zone and (b) the amount of dissolved material carried out from the product stream output end of said zone in the liquid phase of a product stream from said product stream output end, said input slurry stream being comprised of a mixture of a starting slurry stream and a terminal recovered recycle liquid stream, said starting slurry stream being comprised of dispersed particulate solids and washable removables in a liquid phase, said starting slurry liquid additionally containing dissolved material, said terminal recovered recycle liquid stream having been derived from counter-current particulate solids separation and washing in said zone, said terminal recovered recycle liquid containing washable removables and dissolved material therein, said terminal recovered recycle liquid being held in a holding region before being mixed with said starting slurry stream, said product stream being comprised of particulate solids and a product slurry liquid, said particulate solids having been subjected to separation and washing in said zone, said product slurry liquid containing dissolved material therein, said zone comprising at least one stage of continuous particulate solids separation with simultaneous washing of such separated particulate solids by a countercurrently flowing stream of recycle liquid, a drive for operating said zone, and a pressure generator for removal of liquid from said particulate solids being separated in said zone, said recycle liquid comprising a fresh liquid, said recycle liquid being fed into said zone at said product stream output end, said process comprising the steps of --

(A) measuring the instantaneous conductivity of said input slurry stream and generating a first signal representative thereof, (B) measuring (1) the instantaneous flow rate of said input slurry stream, or (2) the instantaneous flow rate of said starting slurry stream, and generating a second signal representative thereof, (C) measuring the instantaneous conductivity of said terminal recovered liquid recycle stream and generating a third signal representative thereof, (D) measuring the instantaneous flow rate at which said terminal recovered liquid recycle stream is admixed with said starting slurry stream and generating a fourth signal representative thereof, (E) combining said first, said second, said third, and said fourth signals to produce a fifth signal representative of the amount of said dissolved material in said starting slurry liquid, and (F) applying said fifth signal to at least one regulator which controls certain dynamic process variables in said zone, said regulator and said certain process variables being (1) a first valve regulator operating a first flow control valve across said recovered recycle liquid stream, or (2) a second valve regulator operating a second flow control valve across said starting slurry stream, or (3) a third valve regulator operating a third flow control valve across said input slurry stream, or (4) a fourth valve regulator operating a fourth flow control valve across said input stream of fresh recycle liquid, or (5) a speed regulator operating said drive for said zones or (6) a pressure regulator operating said pressure generator for removal of liquid from particulate solids so being separated in said zone, while simultaneously maintaining each of those remaining dynamic process variables which are not associated with said regulators within predetermined variable limits, thereby accomplishing the desired controlling.

2. The process of claim 1 wherein said zone comprises at least two of said stages of continuous solids separation, each with simultaneous washing of particulate solids separated therein by a countercurrent flowing of said recycle liquid stream, each succeeding pair of said stages being interconnected by a different reslurry stage wherein separated and washed particulate solids from the succeeding one of said pair of stages are mechanically slurried in recovered recycle liquid from the following one of said pair of stages, and then the resulting such slurry is fed to said following stage for such particulate solids separation and countercurrent washing by recycle liquid from a downstream recycle liquid source.

3. The process of claim 1 where said fifth signal is applied to said fourth valve operating a fourth flow control valve across said input stream of fresh recycle liquid while maintaining all remaining such process variables within predetermined variability limits.

4. A continuous process for controlling in a zone of countercurrent particulate solids separation and washing (a) the amount of dissolved material separated from an input slurry fed into the input slurry end of said zone and (b) the amount of dissolved material carried out from the product stream output end of said zone in the liquid phase of a product stream from said product stream output end, said input slurry stream being comprised of a mixture of a starting slurry stream and a terminal recovered recycle liquid stream, said starting slurry stream being comprised of dispersed particulate solids and washable removables in a liquid phase, said starting slurry liquid additionally containing dissolved material, said terminal recovered recycle liquid stream having been derived from counter-current particulate solids separation and washing in said zone, said terminal recovered recycle liquid containing washable removables and dissolved material therein, said terminal recovered recycle liquid being held in a holding region before being mixed with said starting slurry stream, said product stream being comprised of particulate solids and a product slurry liquid, said particulate solids having been subjected to separation and washing in said zone, said product slurry liquid containing dissolved material therein.

said zone comprising at least one stage of continuous particulate solids separation with simultaneous washing of such separated particulate solids by a countercurrently flowing stream of recycle liquid, a drive for operating said zone, and a pressure generator for removal of liquid from said particulate solids being separated in said zone, said recycle liquid comprising a fresh liquid, said recycle liquid being fed into said zone at said product stream output end, said process comprising the steps of (a) measuring the instantaneous conductivity of said input slurry stream and generating a first signal representative thereof, (b) measuring (1) the instantaneous flow rate of said input slurry stream, or (2) the instantaneous flow rate of said starting slurry stream, and generating a second signal representative thereof, (c) measuring the instantaneous conductivity of said terminal recovered liquid recycle stream and generating a third signal representative thereof, (d) measuring the instantaneous flow rate at which said terminal recovered liquid recycle stream is admixed with said starting slurry stream and generating a fourth signal representative thereof, (e) combining said first, said second, said third, and said fourth signals to produce a fifth signal representative of the amount of said dissolved material in said starting slurry liquid, (f) measuring the instantaneous solids content of said terminal recovered liquid recycle stream and generating a sixth signal representative thereof, (g) measuring the instantaneous quantity of said terminal recovered recycle liquid in said holding zone and generating a seventh signal representative thereof, (h) comparing said fifth signal to each of said sixth and said seventh signals to generate an eighth signal, and (i) applying said eighth signal to at least one regulator which controls certain dynamic process variables in said zone, said regulator and said certain process variables being (1) a first valve regulator operating a first flow control valve across said recovered recycle liquid stream, or (2) a second valve regulator operating a second flow control valve across said starting slurry stream, or (3) a third valve regulator operating a third flow control valve across said input slurry stream, or (4) a fourth valve regulator operating a fourth flow control valve across said input stream of fresh recycle liquid, or (5) a speed regulator operating said drive means for said zone, or (6) a pressure regulator operating said pressure generator for removal of liquid from particulate solids being separated in said zone, while simultaneously maintaining each of those remaining dynamic process variables which are not associated with said regulators within predetermined variability limits, thereby accomplishing the desired controlling.

5. The process of claim 4 where said fifth signal is applied to said fourth valve operating a fourth flow control valve across said input stream of fresh recycle liquid while maintaining all remaining such process variables within predetermined variability limits.

6. Apparatus for controlling in equipment for countercurrent particulate solids separation and washing (a) the amount of dissolved material separated from an input slurry fed into the input slurry end of said equipment and (b) the amount of dissolved material carried out from the product stream output end of said equipment in the liquid phase of a product stream from said product stream output end, said equipment including at least one stage for continuous particulate solids separation and for simultaneous washing, including operational drive means, pressure generation means for removal of liquid from particulate solids separated therein, and having an input slurry location and a product stream output location, a starting slurry conduit means, a terminal recovered recycle liquid conduit means, an input slurry conduit means functionally connected to said input slurry location, to said starting slurry conduit means, and to said terminal recovered recycle liquid conduit means, a product stream conduit means functionally connected to said product stream output location, a fresh liquid conduit means functionally connected to said product stream output location, said apparatus comprising (A) means for measuring the instantaneous conductivity of said input slurry stream and generating a first signal representative thereof, (B) means for measuring (1) the instantaneous flow rate of said input slurry stream, or (2) the instantaneous flow rate of said starting slurry stream, and generating a second signal representative thereof, (C) means for measuring the instantaneous conductivity of said terminal recovered liquid recycle stream and generating a third signal representative thereof, (D) means measuring the instantaneous flow rate at which said terminal recovered liquid recycle stream is admixed with said starting slurry stream and generating a fourth signal representative thereof, (E) means for combining said first, said second, said third, and said fourth signals to produce a fifth signal representative of the amount of said dissolved material in said starting slurry liquid, and (F) means for applying said fifth signal to at least one regulator means to control selected dynamic apparatus variables in said equipment, said regulator means and said selected apparatus variables being (1) first valve regulator means operating a first flow control valve means across said recovered recycle liquid stream, or (2) second valve regulator means operating a second flow control valve means across said starting slurry stream, or (3) third valve regulator means operating a third flow control valve means across said input slurry stream, or (4) fourth valve regulator means operating a fourth flow control valve means across said input stream of fresh recycle liquid, or (5) speed regulator means operating said drive means for said equipment; or (6) pressure regulator means operating said negative pressure generation means for removal of liquid from particulate solids being separated in said equipment, while simultaneously maintaining each of those remaining dynamic apparatus variables which are not associated with said regulator means within predetermined variability limits, thereby accomplishing the desired controlling.

7. The apparatus of claim 6 wherein said equipment comprises at least two serially arranged stages of continuous solids separation, each of said serially arranged stages with simultaneous washing means for particulate solids separated therein which washing means is associated with means for countercurrently flowing said recycle liquid stream from one said stage to another thereof, each succeeding pair of said stages being functionally interconnected by means of a different reslurry station for slurrying particulate solids from the succeeding one of said pair of stages mechanically in recovered recycle liquid from the following one of said pair of stages, and for feeding the resulting such slurry to said following stage.

8. The apparatus of claim 6 where said combining means includes signal output means applied to said fourth valve means for operating a fourth flow control valve means across said fresh liquid conduit means while maintaining all remaining such process variables within predetermined variability limits.

9. Apparatus for controlling in equipment for countercurrent particulate solids separation and washing (a) the amount of dissolved material separated from an input slurry fed into the input slurry end of said equipment and (b) the amount of dissolved material carried out from the product stream output end of said equipment in the light phase of a product stream from said product stream output end, said equipment including at least one stage for continuous particulate solids separation and for simultaneous washing, including operational drive means, pressure generation means for removal of liquid from particulate solids separated therein, and having an input slurry location and a product stream output location, a starting slurry conduit means, a terminal recovered recycle liquid conduit means, an input slurry conduit means functionally connected to said input slurry location, to said starting slurry conduit means, and to said terminal recovered recycle liquid conduit means, a product stream conduit means functionally connected to said product stream output location, a fresh liquid conduit means functionally connected to said product stream output location, said apparatus comprising (a) means for measuring the instantaneous conductivity of said input slurry stream and generating a first signal representative thereof, (b) means for measuring (1) the instantaneous flow rate of said input slurry stream, or (2) the instantaneous flow rate of said starting slurry stream, and generating a second signal representative thereof, (c) means for measuring the instantaneous conductivity of said terminal recovered liquid recycle stream and generating a third signal representative thereof, (d) means for measuring the instantaneous flow rate at which said terminal recovered liquid recycle stream is admixed with said starting slurry stream and generating a fourth signal representative thereof, (e) means for combining said first, said second, said third, and said fourth signals to produce a fifth signal representative of the amount of said dissolved material in said starting slurry liquid, (f) means for measuring the instantaneous solids content of said terminal recovered liquid recycle stream and generating a sixth signal representative thereof, (g) means for measuring the instantaneous quantity of said terminal recovered recycle liquid in said holding region and generating a seventh signal representative thereof, (h) means for comparing said fifth signal to each of said sixth and said seventh signals to generate an eighth signal, and (i) means for applying said eighth signal to at least one regulator means to control selected dynamic apparatus variables in said equipment, said regulator means and said selected apparatus variables being (1) first valve regulator means operating a first flow control valve means across said recovered recycle liquid stream, or (2) second valve regulator means operating a second flow control valve means across said starting slurry stream, or (3) third valve regulator means operating a third flow control valve means across said input slurry stream, or (4) fourth valve regulator means operating a fourth flow control valve means across said input stream of fresh recycle liquid, or (5) speed regulator means operating said drive means for said equipment; or (6) pressure regulator means operating said negative pressure generation means for removal of liquid from particulate solids being separated in said equipment, while simultaneously maintaining each of those remaining dynamic apparatus variables which are not associated with said regulator means within predetermined variability limits, thereby accomplishing the desired controlling.

10. The apparatus of claim 9 where said combining means includes signal output means applied to said fourth valve means for operating a fourth flow control valve means across said fresh liquid conduit means while maintaining all remaining such process variables within predetermined variability limits.

* * * * *